May 31, 1955     B. CHANCE ET AL     2,709,804
AUTOMATIC RANGE AND AZIMUTH TRACKING SYSTEM
Filed Sept. 14, 1945     2 Sheets-Sheet 1
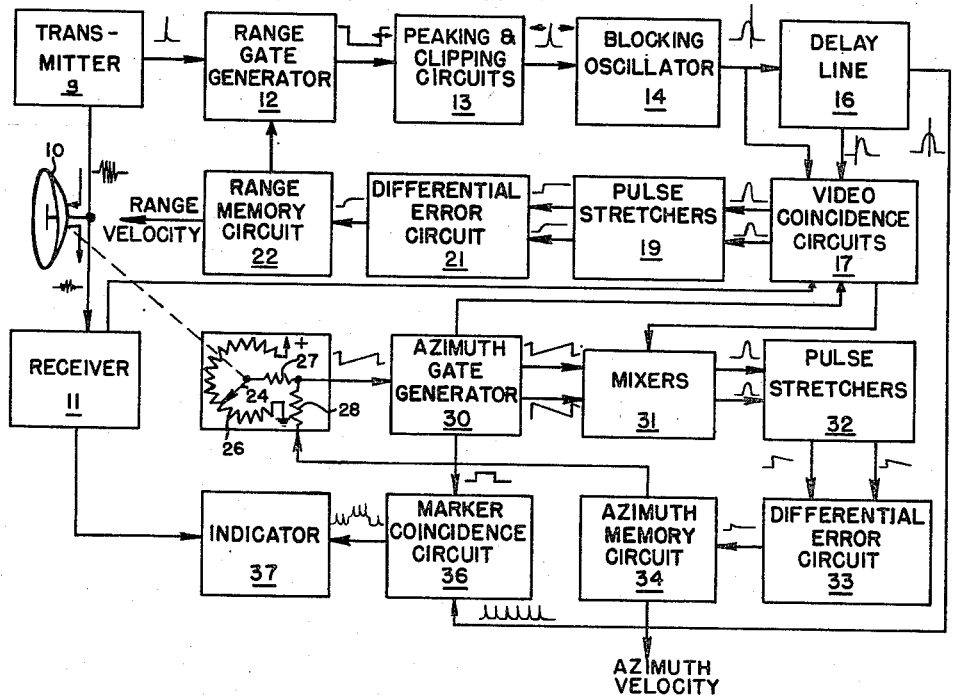
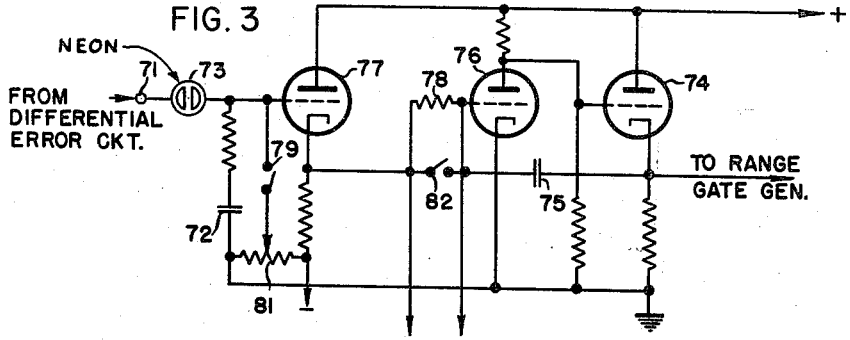
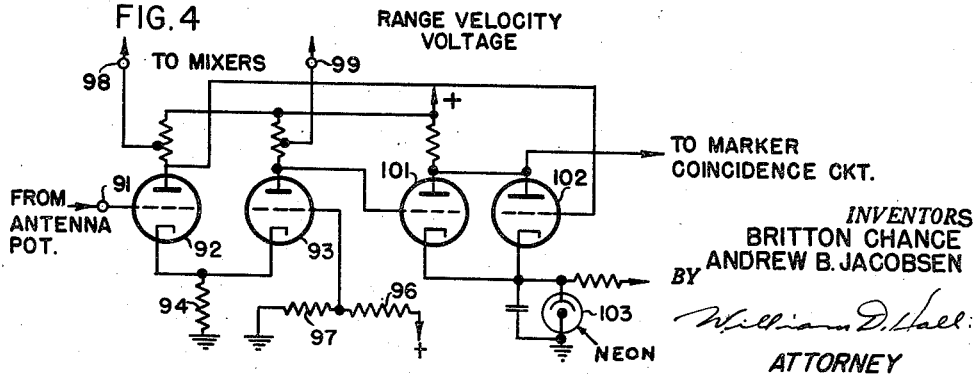
INVENTORS
BRITTON CHANCE
ANDREW B. JACOBSEN
BY William D. Hall
ATTORNEY May 31, 1955  B. CHANCE ET AL  2,709,804
AUTOMATIC RANGE AND AZIMUTH TRACKING SYSTEM
Filed Sept. 14, 1945  2 Sheets-Sheet 2
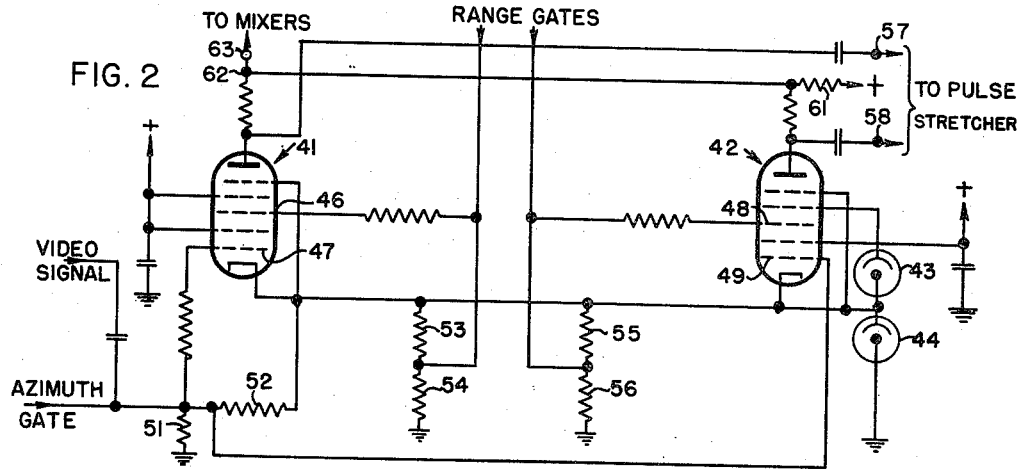
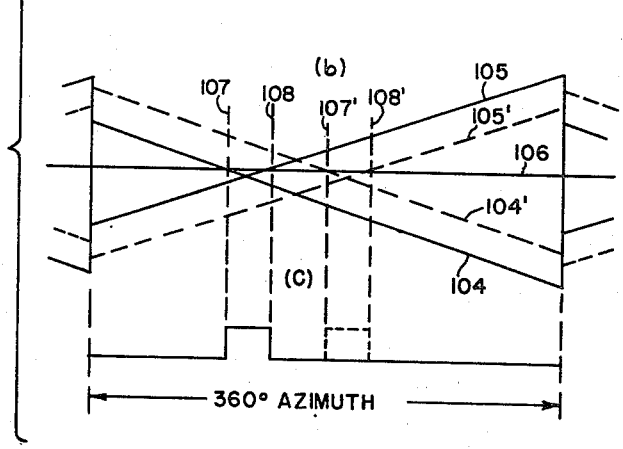
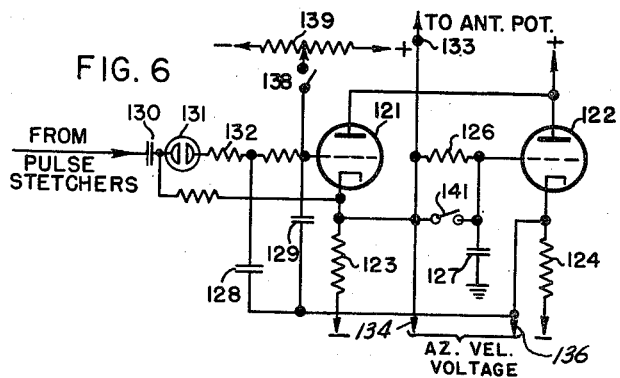
INVENTORS
BRITTON CHANCE
ANDREW B. JACOBSEN
BY
William D. Hall,
ATTORNEY

United States Patent Office 2,709,804
Patented May 31, 1955

2,709,804

AUTOMATIC RANGE AND AZIMUTH TRACKING SYSTEM

Britton Chance, Cambridge, and Andrew B. Jacobsen, Somerville, Mass., assignors, by mesne assignments, to the United States of America as represented by the Secretary of War Application September 14, 1945, Serial No. 616,378

9 Claims. (Cl. 343—7.4)

This invention relates generally to electrical circuits and more especially to electrical circuits for causing a radio echo detection apparatus to track in range and azimuth while scanning.

Many radio echo detection systems are equipped with antennae which may be caused to rotate continuously and uniformly so that the beam of radio frequency energy scans all of the space within range of the apparatus. In systems intended for continuous scanning, a preferred method of indicating objects detected is by means of a cathode ray tube in which the electron beam is caused to scan in a radial direction, each scan beginning simultaneously with the transmission of a pulse of radio frequency energy, the radial direction of scan being caused to rotate in synchronism with the rotation of the antenna. Such an indicator presents an approximate map of the area surrounding the apparatus, and is known as a plan position indicator.

In such an apparatus as described above it may be desirable to provide means for continuous tracking of a moving object within the purview of the antenna without causing said antenna to be aimed continuously at the moving object. It is an object of this invention to provide means for producing such tracking in both range and azimuth.

Other objects, features, and advantages of this invention will suggest themselves to those skilled in the art and will become apparent from the following description of the invention taken in connection with the accompanying drawing in which:

Fig. 1 is a block diagram of a circuit embodying the principles of this invention;

Fig. 2 is a schematic wiring diagram of the video coincidence circuit of Fig. 1;

Fig. 3 is a schematic wiring diagram of memory circuit 22 of Fig. 1;

Fig. 4 is a schematic wiring diagram of the azimuth gate generator of Fig. 1;

Fig. 5 is a series of waveforms used in explanation of the azimuth gate generator of Fig. 4; and Fig. 6 is a schematic wiring diagram of memory circuit 34 of Fig. 1.

Referring now more particularly to Fig. 1, transmitter 9 produces periodic pulses of radio-frequency energy which are radiated by antenna 10, and receiver 11 receives the reflected echo pulses. Transmitter 9 also produces a positive voltage pulse coincident in time with each radio frequency pulse, said voltage pulses being fed to variable range gate generator 12.

Variable range gate generator 12 may be any one of several circuits for producing a series of negative rectangular voltage pulses of variable duration. For example, it may be the circuit shown in the application by John C. Reed, Jr., Serial No. 594,253, entitled "Communication System," filed May 17, 1945, now abandoned.

Each of the positive pulses applied to range gate generator 12 causes it to produce a negative voltage pulse, the duration of which is varied in accordance with a D.-C. voltage. This D.-C. voltage is caused to vary in such a way that the trailing edge of each of the negative rectangular voltage pulses produced by variable range gate generator 12 occurs a fraction of a microsecond prior to reception of an echo pulse from the object being tracked. The manner in which this is accomplished will be more fully explained below.

The negative voltage pulses of variable duration from variable gate generator 12 are applied to amplifying, clipping, and differentiating circuit 13. The operations performed by circuit 13 may be accomplished by any of various means well known in the art, so that the output from circuit 13 is a series of positive pulses of voltage, each coinciding with the trailing edge of a negative voltage pulse received from variable gate generator 12. These output pulses therefore occur a fraction of a microsecond prior to reception of an echo pulse.

The positive pulses of voltage from circuit 13 are applied to blocking oscillator 14 which is a circuit well known to those skilled in the art; an example being shown in Fig. 34a, page 514, Radio Engineer's Handbook, by F. E. Terman, published by McGraw-Hill Book Company, Inc., in 1943. Blocking oscillator 14 is so arranged that each input pulse causes it to go through one cycle of oscillation, thereby producing a positive voltage pulse somewhat rounded in character. These output pulses are applied to delay line 16 and to one channel of video coincidence circuit 17.

Delay line 16 consists of a network of capacitive and inductive elements forming an approximation to a transmission line having lumped constants, an arrangement well known in the art. A voltage pulse applied to one end of such a transmission line is not transmitted instantaneously to the other end of the line but suffers a delay proportional to the electrical length of the line. The line is terminated in an impedance approximately equal to its characteristic impedance so that the output pulse has substantially the same shape as the input pulse. The delayed pulses are fed to a second channel of video coincidence circuit 17. The undelayed and delayed pulses fed to coincidence circuit 17 will be termed first and second range gates respectively.

Video coincidence circuit 17, which will be described in detail with reference to Fig. 2 has two channels as previously indicated. Each channel receives two input signals in addition to the pulses just described; namely, positive echo pulses from the target being tracked, and a D.-C. voltage which renders each channel operative only during those portions of the antenna rotation cycle in which the antenna is aimed at the target being tracked. This latter voltage will be termed the rectangular azimuth gate, and the means by which it is produced will be further explained below. The first channel of circuit 17 produces a series of voltage pulses, the amplitude of which is indicative of the amount of overlap between the returning echo pulses and the first range gate. Similarly, the second channel of circuit 17 produces a series of voltage pulses, the amplitude of which is indicative of the amount of overlap between the returning echo pulses and the second range gate. Hence, the two series of output pulses produced in video coincidence circuit 17 have equal amplitudes only in the event that the echo pulses occur exactly half way between the two range gates. The amount by which an echo pulse overlaps one range gate more than the other will be termed range error.

Pulse stretchers 19 receive the two series of output pulses from video coincidence circuit 17 and operate to increase the time duration of these pulses over several pulse repetition periods. The outputs from pulse stretchers 19 may thus be regarded as two D.-C. voltages, the difference in magnitude between which is a measure of the range error. Pulse stretchers 19 may be similar to those described in the application by Andrew B. Jacobsen, Serial No. 584,233, entitled "Electrical Circuit," filed March 22, 1945, now U. S. Patent 2,609,533, issued September 2, 1952.

The output voltage from pulse stretchers 19 are compared by differential error circuit 21 to produce a single output voltage whose magnitude is proportional to the range error. Differential error circuit 21 may be of the type described in the application by Andrew B. Jacobsen, Serial No. 584,233, referred to above.

The output voltage from differential error circuit 21 is applied to memory circuit 22, which will be described in detail with reference to Fig. 3. Memory circuit 22 produces a D.-C. output voltage which is proportional in magnitude to the range of the target being tracked. This output voltage is fed back to variable gate generator 12 so that the range gates are maintained in a correct position to track the target as described. It is evident that if the target range is continually changing, the D.-C. range voltage must also change continuously in magnitude. Memory circuit 22 is adapted to cause the range voltage to continue to change linearly during the intervals when the antenna is not aimed at the target, so that when the antenna returns to the target the range gates will be in approximately the correct position. Memory circuit 22 is also adapted to furnish an output voltage proportional to the rate of change of range, which may be applied to a meter for direct indication if desired.

In order to obtain tracking in azimuth, it is necessary to obtain a voltage which is a measure of the antenna position. This may be done in any of several ways well known in the art, for example by the use of selsyns. In the embodiment of the invention described herein, antenna 10, which is rotated continuously by a motor, not shown, is arranged to drive rotating contact 24 of potentiometer 26 in a synchronous manner, that is, at the rate of one revolution per antenna revolution. Potentiometer 26 has a linear resistance winding and is connected between a source of positive potential and ground. The potential at rotating contact 24 therefore varies in a sawtooth manner, with a period of one cycle per antenna revolution.

The sawtooth voltage from rotating contact 24 is applied to one end of the series combination of resistors 27 and 28. To the other end of this series combination is applied a D.-C. voltage the magnitude of which is indicative of target azimuth. This voltage is hereinafter referred to as the azimuth position voltage, and the manner and means by which it is produced will be made clear as the discussion proceeds.

It will be obvious to those skilled in the art that the voltage appearing at the junction between resistors 27 and 28 will be the sum of the sawtooth voltage referred to above, and the azimuth position voltage. This resultant voltage is applied to azimuth gate generator 30 which produces the azimuth gate voltage mentioned previously with reference to video coincidence circuit 17, and a pair of sawtooth voltage waves, one of which is inverted with respect to the other. The means by which these voltages are produced will be explained subsequently with reference to Fig. 4.

The opposed sawtooth voltages produced by azimuth gate generator 30 may be referred to as a pair of sloping azimuth gates. These gates are fed to mixers 31, which are of the pentagrid type and are well known in the art. Here the azimuth gates are mixed with a video signal from video coincidence circuit 17. This video signal is a composite of the two signals applied to pulse stretchers 19, and is therefore a series of echo pulses from the target being tracked, and is said to be "gated" since all other echo signals are eliminated. The mixing operations performed by mixers 31 are therefore multiplications of the target echo pulse by the instantaneous value of each sloping azimuth gate, the resulting output pulses evidently having equal amplitudes only if the sloping azimuth gates have the same value at the time of the echo return. It will be obvious to those skilled in the art that, while sloping azimuth gates are employed in the preferred embodiment of the invention, as described herein, it would also be possible to accomplish an equivalent result by the use of rectangular or other shaped gates.

The output pulses from mixers 31 are fed successively to pulse stretchers 32 and differential error circuit 33 which function in the same manner as previously described with reference to pulse stretchers 19 and differential error circuit 21. The output from differential error circuit 33 is therefore in effect a D.-C. voltage the magnitude and polarity of which are measures of the amount and direction of the azimuth error; it is therefore designated the azimuth error voltage.

The azimuth error voltage is applied to memory circuit 34, which will be described in detail with reference to Fig. 6. Although somewhat different in structure from memory circuit 22, memory circuit 34 has substantially the same function; that is, it produces a D.-C. voltage which is proportional in magnitude to the target azimuth and which continues to change at a linear rate (if the actual target azimuth is changing) during the intervals when the antenna is not aimed at the target. This azimuth position voltage is applied to one end of the resistor 28, as mentioned previously. Memory circuit 34 is also adapted to provide a voltage proportional to rate of change of azimuth, which may be applied to a meter for direct indication if desired.

Delay line 16 is tapped at a point midway between its two ends, so that a voltage pulse occurring halfway between the two range gates is obtained. This pulse is applied, together with a rectangular azimuth gate similar to that supplied to video coincidence circuit 17, to marker coincidence circuit 36, which may be of any one of several coincidence circuits well known in the art. Marker coincidence circuit 36 produces a series of voltage pulses each of which occurs whenever a rectangular azimuth gate and a range pulse are simultaneously present. These pulses are fed to plan position indicator 37, in such a way as to intensify the electron beam. Hence a bright trace is caused to appear on the cathode ray tube screen at a point corresponding to the azimuthal and range position of the target being tracked, and superimposed upon the pattern of reflecting objects, produced by video signals from receiver 11.

Referring now more particularly to Fig. 2 for an explanation of video coincidence circuit 17 of Fig. 1, tubes 41 and 42 are mixers of the pentagrid type. Voltage regulator tubes 43 and 44, and the networks comprising resistors 51, 52, 53, 54, 55, and 56 are connected to grids 46, 47, 48, and 49 for the purpose of maintaining negative cutoff bias thereon. The rectangular azimuth gate mentioned previously is applied to grids 47 and 49 in such a way that tubes 41 and 42 are brought to the threshold of conduction during said azimuth gate. The video signals are also applied to grids 47 and 49 and the first and second range gates are applied respectively to grids 46 and 48. It will be obvious to those skilled in the art that tubes 41 and 42 can therefore conduct only during the simultaneous presence of an azimuth gate, a video signal, and the range gates, and that the instantaneous magnitudes of the output pulses at the plates of tubes 41 and 42 are proportional to the product of the video signal and range gate instantaneous amplitudes.

These pulses are those previously described with reference to Fig. 1 and are transmitted through terminals 57 and 58 to pulse stretchers 19 of Fig. 1.

Plate load resistor 61 is common to both tubes 41 and 42, so that the signal at junction 62 is a composite of the output pulses from the individual plates of tubes 41 and 42. This is the video signal gated both in range and azimuth previously described with reference to mixers 31 of Fig. 1 and is transmitted thereto via terminal 63.

Referring now more particularly to Fig. 3 for an explanation of memory circuit 22 of Fig. 1, the range error signal previously described is applied to terminal 71 and charges condenser 72 to a potential approaching the error signal value. Neon tube 73 is connected in series with the error signal input in order that only error signals differing from the existing potential on condenser 72 by a fixed amount will cause further charging or discharging of condenser 72. Tube 74 is connected as a cathode follower so that, assuming it to have an amplification of unity, condenser 75 is in effect connected between grid and plate of tube 76. Tube 77 is also connected as a cathode follower so that the potential appearing at its cathode is proportional to the range error. It will be obvious to those skilled in the art that the rate of charging or discharging condenser 75 will also be proportional to range error; the total charge on condenser 75 thus becomes proportional to range and the rate of charging condenser 75 proportional to range velocity. Accordingly, the voltage at the cathode of tube 74 is the range position voltage returned to variable range gate generator 12 and the voltage across resistor 78 is the range velocity voltage mentioned previously.

Since it may be desired to adjust the range gate position manually when beginning tracking of a particular target, switch 79 is arranged to apply a variable voltage directly from potentiometer 81 to the grid of tube 77, potentiometer 81 being adjusted until the range gates are centered upon the target. This condition is indicated by the coincidence of the marker produced by marker coincidence circuit 36 with the trace of the desired target on the cathode ray tube indicator screen. During this process, switch 82 is also closed to short-circuit resistor 78 so that condenser 75 suffers no delay in being charged to the correct range voltage. As soon as the range gates are centered upon the target, switches 79 and 82 are opened and range tracking proceeds automatically.

Referring now more particularly to Figs. 4 and 5 for an explanation of azimuth gate circuit 30, the sawtooth voltage from antenna potentiometer 26 as previously described is applied at terminal 91 and fed to the grid of tube 92. Tubes 92 and 93 are connected as linear amplifiers, but having cathode resistor 94 in common. The grid of tube 93 is maintained at a fixed potential by a voltage divider comprising resistors 96 and 97. It will be obvious to those skilled in the art that during the rising portion of the sawtooth voltage on the grid of tube 92, the current flow through resistor 94 increases, thereby causing the current conducted by tube 93 to decrease uniformly. The voltage at the plates of tubes 92 and 93 is therefore also sawtooth waves, the waveform at the plate of tube 93, however, being inverted by comparison with that at the plate of tube 92. These two voltages are the sloping gates previously described and are transmitted through terminals 98 and 99 to mixers 31 of Fig. 1.

The waveforms just described are illustrated in Fig. 5. In Fig. 5a the solid sawtooth wave represents the input voltage at the grid of tube 92. In Fig. 5b, curve 104 represents the variation in plate voltage of tube 92, and curve 105 represents the variation in plate voltage for tube 93. These latter are also the voltage waveforms applied to the grids of tubes 102 and 101 respectively. The plates and cathodes of tubes 101 and 102 are connected in parallel, the cathodes being maintained at a positive potential by voltage regulator tube 103 so that only one of these tubes can conduct at a time. This is illustrated in Fig. 5b by the horizontal solid line 106, which is drawn to represent the cutoff grid potentials for these tubes. It will be observed that as the grid voltage applied to tube 102 decreases, the cutoff potential is reached at a time indicated by the vertical dashed line 107 and that in the interval between lines 107 and 108 neither tube conducts. At the time indicated by vertical dashed line 108, tube 101 begins to conduct. In this interval, then, the joint plate potential of tubes 101 and 102 rises to the supply value, producing thereby a rectangular positive pulse of potential as indicated in Fig. 5c. This voltage is the rectangular azimuth gate described previously with reference to Fig. 1.

It will be further observed that if, as a result of the operation of the azimuth tracking circuit as outlined previously, the D.-C. voltage applied to the grid of tube 92 were decreased as indicated by the dashed sawtooth curve of Fig. 5a, then in Fig. 5b curve 104 representing the grid potential of tube 102 rises to a new position 104'. The immediate consequence is that curve 105, representing the grid potential of tube 101 falls to a new position 105' and the rectangular azimuth gate moves to a new position defined by the interval between vertical dashed lines 107' and 108'.

It should be noted that in Fig. 5c, for the sake of clearness in drawing, the rectangular azimuth gates have been indicated as occupying a much larger azimuth angle than would be the case in actual practice.

Referring now more particularly to Fig. 6 for a description of memory circuit 34 of Fig. 1, tubes 121 and 122 are connected as cathode followers in cascade, their cathodes being connected respectively through resistors 123 and 124 to a negative terminal of a source of voltage. The cathode of tube 121 is connected through resistor 126 to the grid of tube 122, said grid also being connected through condenser 127 to ground. The cathode of tube 122 is coupled through condensers 128 and 129 to the grid of tube 121 to complete a feedback path, the input signal from differential error circuit 33 being also applied to this grid via condenser 130, neon bulb 131 and resistor 132.

When condenser 128 is charged to a voltage equal to the sum of the grid-to-cathode voltages in tubes 121 and 122, the potential difference across resistor 126 is zero and the charge on condenser 127 is static. When the voltage on condenser 128 differs from the sum of the grid-to-cathode voltages, the excess or deficiency of voltage also appears across resistor 126 and the charge on condenser 127 changes at a substantially linear rate proportional to the excess or deficiency.

When the error voltage from differential error circuit 33 exceeds the breakdown potential of neon bulb 131, the charge on condenser 128 is increased or decreased according to the polarity of the error signal, thereby altering the potential at the cathode of tube 121. Since condenser 128 has no charge or discharge path in the absence of error signal, it is easily able to retain its charge during the interval in which the antenna is aimed away from the target, and the potential at the cathode of tube 121 is maintained at the value established by the last received error signal. The potential at the cathode of tube 121 is returned via terminal 133 to the input of azimuth gate generator 30 and is the azimuth position voltage described previously.

It will be obvious to those skilled in the art that the potential difference across resistor 126 is proportional to the rate of change of azimuth, and the potential between the cathodes of tubes 121 and 122 is proportional to the rate of azimuth change plus a constant. This voltage is made available at terminals 134 and 136, and may be applied to an indicating means if desired.

Switch 138 is adapted to apply an adjustable potential from potentiometer 139 to the grid of tube 121, so that the azimuth position may be adjusted when it is desired to begin tracking on a target. For this operation, switch 141 is arranged to short circuit resistor 126 so as to eliminate delay in charging condenser 127. When the correct azimuth position is reached, switches 138 and 141 are opened and tracking proceeds automatically. It will be further obvious that the tracking function may be extended to tracking in elevation by the addition of a circuit similar to the azimuth tracking circuit. In this case it will be understood that the antenna will scan in elevation as well as in azimuth.

It will also be obvious to those skilled in the art that still further changes and modifications may be made in this invention without departing from the scope of the invention.

The invention claimed is:

1. Means including a rotating antenna for receiving an incoming pulse, means for producing a voltage in accordance with the expected time of arrival of said incoming pulse, means for producing two mutually inverted sawtooth voltage waves each having an independently controllable level and having a period equal to the period of rotation of said rotating antenna, means for combining each of said sawtooth waves with said incoming pulse to produce two pulses varying in accordance with the level of the sawtooth waves and the time of occurrence of the incoming pulse, means coupled to said combining means to compare said two varying pulses produced by said combining means to produce an error voltage, means controlled by said error voltage and said voltage in accordance with the expected time of arrival to produce and store a voltage which is a measure of the azimuth angle of the rotating antenna at the expected time of arrival of said incoming pulse, and means for feeding back the voltage from said means to produce and store to said sawtooth wave producing means for causing the level of said sawtooth waves to vary equally and oppositely in accordance with said azimuth angle measure.

2. Means for producing a pulse at a time indicative of the range to an object, means for producing a pulse indicative of the azimuth to said object, means for indicating the azimuth and range to said object, and coincidence means connecting the two first mentioned means to said indicating means so that a pulse from said coincidence means indicative of said object is applied to said indicating means only when said range pulse and said azimuth pulse are in time coincidence.

3. A radio-object locating system comprising a continuously rotating directional antenna system, transmitting means coupled to said antenna system for transmitting a series of radio pulses, receiving means coupled to said antenna system for receiving echo signals of said pulses from all reflecting objects within the range of said pulses, range-predicting means for deriving a first continuous voltage approximately proportional to the range of a particular object, range-signal means coupled to said transmitting and range-predicting means for producing a first signal having a time of occurrence relative to said transmitted pulses proportional to said first voltage, direction-predicting means for deriving a second continuous voltage approximately proportional to the direction of said particular object, direction signal means coupled to said antenna system and said direction-predicting means for producing a second signal occurring approximately when said antenna system is pointing in the direction of said particular object and for producing a third signal which is a function of said second voltage and the direction of said antenna system, range-comparing means gated by said second signal for comparing the time of occurrence of said echo signals with the time of occurrence of said first signal to produce a range error signal only during the time of occurrence of said second signal, direction-comparing means gated during the time of occurrence of said range error signal, said third signal being applied to said range-comparing means for obtaining a direction error signal proportional to the value of said third signal during the time of occurence of said range error signal, means for applying said range error signal to said range-predicting means for correcting said first voltage to render it more nearly proportional for the range of said particular object, means for applying said direction error signal to said direction predicting means for correcting said second voltage to render it more nearly proportional to the direction of said particular object, and means utilizing said first and second signals for tracking said particular object.

4. A radio-object locating system according to claim 3, wherein the rate of correction of said first voltage is proportional to the magnitude of said range error signal, and the rate of correction of said second voltage is proportional to the magnitude of said direction error signal.

5. A radio-object locating system according to claim 3, wherein said utilizing means comprises a cathode ray means coupled to said receiving means for presenting a display of range and direction of all of said reflecting objects, coincidence means, means for applying said first and second signals to said coincidence means to obtain an output therefrom only during the simultaneous presence of both said first and second signals, and means for applying said output to said cathode ray means to produce a marker thereon which superimposes the display of said particular object.

6. A radio-object locating system comprising a continuously rotating directional antenna system, transmitting means coupled to said antenna system for transmitting a series of radio pulses; receiving means coupled to said antenna system for receiving echo signals of said pulses from all reflecting objects within the range of said pulses; and tracking means coupled to said receiving means and transmitting means for tracking a selected reflecting object in both direction and range, said tracking means including a range circuit and a direction circuit associated with said selected object, said range circuit producing a first control pulse at a time interval after the transmission of each pulse substantially equal to the time interval between the transmission of a pulse to the selected reflecting object and the receipt of an echo signal therefrom, said direction circuit producing a second control pulse when said antenna system is pointing substantially in the direction of the selected object, and said tracking means further including coincidence means for said range and direction circuits to which said first and second control pulses are applied, said coincidence means producing an output only during the simultaneous presence of both said first and second control signals.

7. A radio-object locating system according to claim 6, further including a cathode ray indicator coupled to said receiving means for presenting a display of range and direction of all said reflecting objects, and means for applying the output of said coincidence means to said indicating means to produce a marker thereon which superimposes the display of said selected reflecting object.

8. A radio-object locating system according to claim 6, wherein said range circuit comprises a range-predicting means coupled to said transmitting means producing said first control pulses, range error signal means gated by the simultaneous presence of said second control signal and echo signals from the selected reflecting object for producing a range error signal, and means for applying said range error signal to said range-predicting means to provide a correction in the time of occurrence of said first control signal; and wherein said direction circuit comprises a direction-predicting means coupled to said antenna system for producing said second control pulse, means coupled to said antenna system for producing a direction signal proportional to the direction of said antenna system, direction error signal means gated by the simultaneous presence of said range error signal and said direction signal for producing a direction error signal, and means for applying said direction error signal to said direction-predicting means to provide a correction in the time of occurrence of said second control pulse.

9. In a system of the character described, means for producing an antenna beam scanning through space for developing video echo signals, means for developing an angle gate when the antenna beam is in a predetermined position, means for producing an electrical characteristic representative of the range of the object, said producing means including video utilization means for gating said video with said angle gate before application to said utilization means.

References Cited in the file of this patent

UNITED STATES PATENTS

| | | |
|---|---|---|
| 1,924,174 | Wolff | Aug. 29, 1933 |
| 2,409,448 | Rost | Oct. 15, 1946 |
| 2,482,544 | Jacobsen | Sept. 20, 1949 |
| 2,516,356 | Tull et al. | July 25, 1950 |